Feb. 27, 1962 G. E. CLAUSSEN 3,023,301
SILICA-FREE WELDING FLUX
Filed March 5, 1956
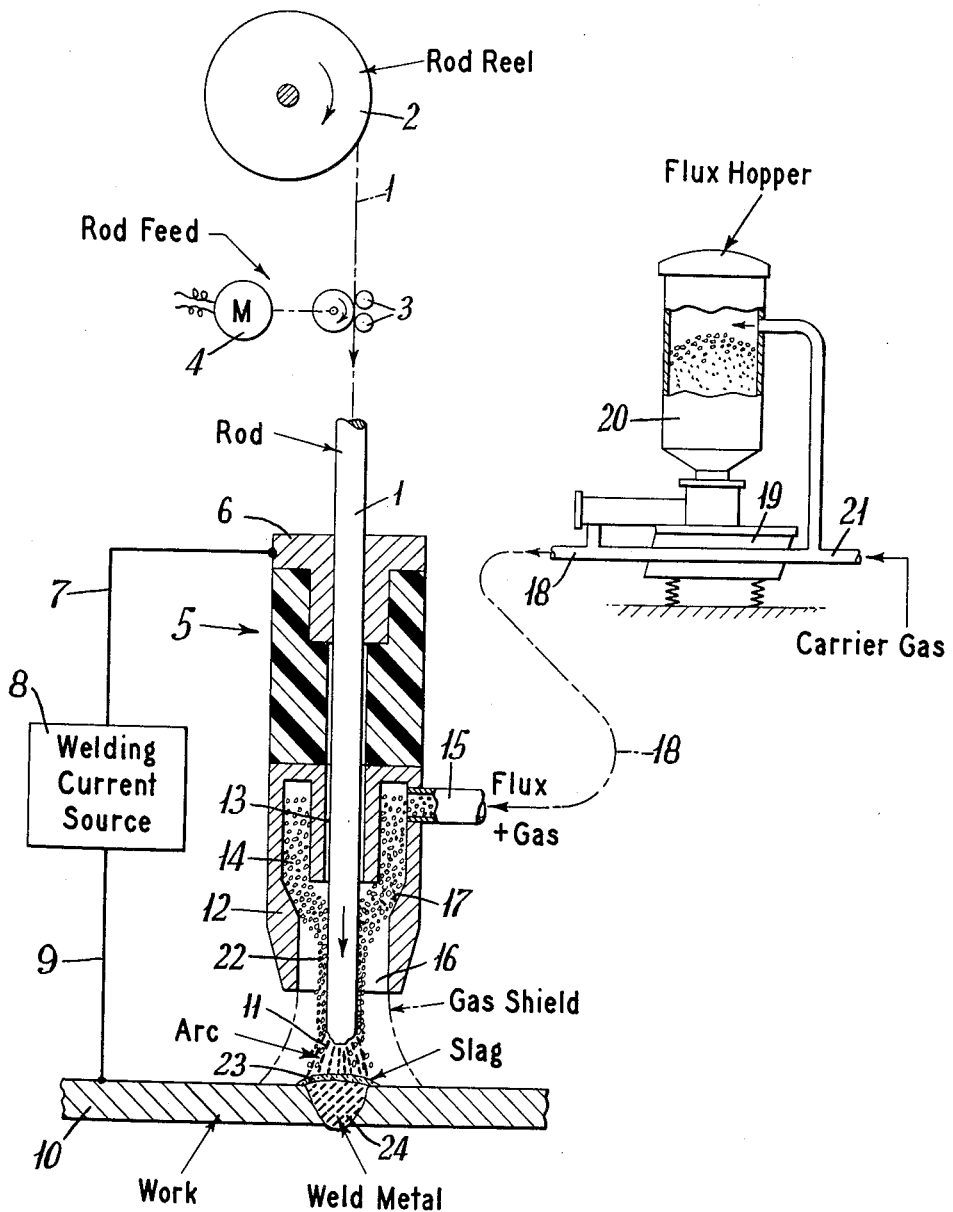
INVENTOR.
GERARD E. CLAUSSEN
BY
Barnwell R. King
ATTORNEY United States Patent Office 3,023,301
Patented Feb. 27, 1962

3,023,301
SILICA-FREE WELDING FLUX
Gerard E. Claussen, Niagara Falls, N.Y., assignor to Union Carbide Corporation, a corporation of New York
Filed Mar. 5, 1956, Ser. No. 569,382
4 Claims. (Cl. 219—74)

This invention relates to welding and, more particularly, is concerned with a novel magnetic silicafree flux for electric arc welding.

In the earliest methods of electric arc welding, direct current was fed into a bare electrode and an arc maintained between the electrode and the work. Such bare electrode welding process had the advantage of simplicity and could be performed automatically or by hand, but was limited to a current of about 200 amperes. Consequently, the welds had to be made in very thin successive layers of the order of 1/16 inch thick. Also, the weld metal was transferred through an arc zone of ionized atmospheric gases with which it reacts, forming large amounts of oxides and nitrides. The weld metal, as a result, was porous, brittle, and weak.

The first important improvement in the electric welding art was to apply a coating to the electrode. There are various types of coatings but they all serve the same main general functions. The coating forms a cup-like shield around the tip of the electrode, protecting it during welding. It produces a slag which protects the deposited weld metal, provides a medium for the addition of alloying elements and deoxidizers, and stabilizes the arc. Coatings also make it possible to use higher welding currents.

Though there have been great advances in fluxes for electric arc welding, there are many problems still to be overcome. Silica from the flux should pass into the slag, but is often found in the weld metal in sufficient quantities to cause serious deterioration in mechanical properties. When gases are evolved by the flux, they tend to get into the weld metal and some of them have serious effects on the strength of the joint. With many fluxes, it is difficult or impossible to weld in the vertical and overhead positions. The flux of the present invention overcomes such difficulties, in addition to which it is magnetic, since the process for which it was developed requires that it should adhere magnetically to the wire.

A primary object of this invention is to provide a flux which will not introduce silica into the weld metal.

Another object of the invention is to provide a non-gas-evolving flux.

A further object of the invention is to provide a flux which will adhere magnetically to the electrode.

It is a further object of this flux to obtain good slag removal.

According to the invention there is provided a welding flux containing a magnetic material, so that the flux will adhere to the electrode. Such flux has a composition within the following ranges:

| | Preferred, percent | General, percent |
|---|---|---|
| Manganese dioxide | 0–13 | 0–25 |
| Manganese oxide | 0–5 | 0–10 |
| Rutile | 17–33 | 12–40 |
| Alumina | 0–25 | 0–30 |
| Fluoride | 2–6 | 1–10 |
| Silicon, as ferro-alloy | 2–9 | 1–10 |
| Manganese, as ferro-alloy | 4–7 | 2–10 |
| Magnetic component | 20–28 | 15–48 |
| | + binder | + binder |

The invention is illustrated in the single FIGURE of the drawing, which is a diagram mainly in elevation with parts in section of the apparatus.

As shown in the drawing, a consumable electrode 1 in the form of a rod or wire of metal is drawn from a supply reel 2 by a feed mechanism 3 that is driven by a motor 4, and fed through a torch 5. The torch comprises a tubular contactor 6 connected by a lead 7 to one side of a welding current source 8 the other side of which is connected by a lead 9 to the work 10 in the form of a plate of metal. An arc 11 is energized between the business end of the electrode 1 and the work 10 by such source 8 during the welding operation.

Mounted on the torch 5 is a cup or nozzle 12 having a central passage 13 for the electrode 1, and an annular passage 14 for gas-borne flux provided with a lateral inlet 15. The annular passage 14 leads to an orifice 16 by way of a tapered annular shelf 17 in the cup. Such inlet 15 is connected by a pipe 18 to a vibratory-type flux dispenser 19 comprising a flux hopper 20 having a carrier gas inlet 21.

The flux is carried through the pipe 18 in a carrier gas stream of carbon dioxide, or other suitable gas. The gas stream containing the flux is deflected by the shelf 17 towards the electrode 1, to which the flux adheres magnetically, forming a thin, even layer 22. As the heat of the arc 11 melts the end of the electrode it also melts the flux which forms an easily removable slag 23 on the surface of the weld metal 24.

The flux of this invention has better slag removal properties than magnetic fluxes previously used, and it does not leave silica in the weld metal. Nor does it evolve gases. Since it does not evolve gases, there is no deterioration of physical properties of the weld metal due to the contained gases. Normally fluxes on covered or coated electrodes for electric arc welding contain up to 20% of calcium carbonate, so that enough carbon dioxide is provided by decomposition to protect the weld metal. Since the present flux does not contain calcium carbonate, the concentrations of the various compounds of which it is formed can be higher and the economic efficiency consequently increased. The present flux has a considerable shielding effect so that welding can be carried out in drafts, and cuts down radiation from the arc which may affect the operator. It reduces spatter and makes possible the use of higher currents than previously possible, as well as making it feasible to weld in both the vertical and overhead positions.

Rutile is a fundamental constituent of the flux; essentially it stabilizes the arc, but it also acts as a slag modifier. Ferrosilicon acts as a deoxidizer which can be substituted by ferroaluminum or aluminum powder. Ferrotitanium and ferrozirconium have also been used as deoxidizers in this flux, and have been found to be satisfactory. If the electrode contains sufficient deoxidizer, then there need be none in the flux. Ferromanganese has various functions. It has a deoxidizing action, but in the absence of ferrosilicon it leaves the weld metal very porous. Therefore, the flux must contain an alloy of silicon as well as one of manganese. The metals may be in the form of ferrosilicon, ferromanganese or silicomanganese or mixtures of these alloys.

Ferromanganese also desulfurizes the weld metal and generally imparts good bead appearance. Manganese ore considerably improves the slag behavior. It also has functions similar to those of the ferromanganese, so that if there is a high manganese ore content the amount of ferromanganese in the flux can be reduced. Manganese ore is oxidant, and if there is an appreciable amount of it present there must be a corresponding increase in the content of reducing materials in the flux. The manganese ore, together with the aluminum and magnesium oxides, acts as a slag modifier. Draft resistance and resistance to air contamination are provided by the fluoride component. Since the flux is required to adhere magnetically to the electrode, a ferromagnetic constituent is included, usually either metallic iron or a ferrite, such as magnetite, or both. Iron and magnetite compensate each other so that if the flux contains a high content of one there need be little or none of the other present.

However, when there is an appreciable quantity of magnetite present, the content of reducing materials in the flux must be raised to counteract the oxidizing effect. The binder used is usually one or more of either sodium silicate, sodium aluminate, or potassium aluminate, the potassium compound being used when the welding is to be carried out with an alternating current.

Alloy additions to the weld metal can be made by including the metals to be alloyed in the flux, as normally they do not affect the action of the flux. It has been found empirically that there is a general relationship between the oxidizing materials, chiefly manganese ore and magnetite, present in the flux and the reducing materials consisting of ferrosilicon, ferromanganese, ferrotitanium, and ferrozirconium. It has also been found empirically that when the magnetite content is high it is best to decrease the fluoride content correspondingly.

The mechanical properties of the weld produced depend not only on the composition of the electrode used, but also to a large degree on the composition of the flux. For example, if the manganese content of the flux is high, the tensile strength of the weld metal will be increased. It is, therefore, possible to obtain welds with varied mechanical properties using the same electrode, by altering the composition of the flux within the range given.

More specifically, the advantages and novel features of the present flux are illustrated by the following examples. The flux was carried in carbon dioxide through the gas inlet tube to the chamber where it was deflected by the shelf towards the electrode to which it adhered magnetically. The flux coating formed was coherent and even. The electrode and the flux coating were melted by the arc, the flux forming an easily removable slag on the surface of the weld metal. The following table shows the compositions (in each example the binder is equal to the percent difference between 100% and the total percent of the other ingredients) of the various fluxes tested:

TABLE I (Part I)

| Flux example No. | 1 | 2 | 3 | 4 | 5 | 6 |
|---|---|---|---|---|---|---|
|  | Pct. | Pct. | Pct. | Pct. | Pct. | Pct. |
| $MnO_2$ | 3.4 | 3.5 | 3.5 |  | 3.5 | 3.5 |
| MgO | 4.5 | 4.7 | 4.7 |  | 4.7 | 3.5 |
| Rutile | 28.1 | 29.2 | 29.2 | 32.7 | 22.3 | 28.8 |
| $Al_2O_3$: |  |  |  |  |  |  |
| (1) High alumina slag |  |  |  | 24.8 |  | 19.4 |
| (2) Calcined bauxite | 16.8 | 17.5 | 17.5 |  | 24.7 |  |
| Fluoride: |  |  |  |  |  |  |
| Cryolite |  | 1.8 | 1.8 |  |  | 3.5 |
| $CaF_2$ | 2.2 |  |  | 2.3 | 2.3 |  |
| Magnetite | 16.8 | 16.3 | 12.9 | 12.4 | 12.9 | 7.1 |
| Iron | 5.6 | 7.0 | 10.4 | 10.1 | 10.6 | 16.5 |
| Fe—Si | 12.4 | 9.3 | 9.3 | 7.9 | 9.4 | 8.2 |
| Si—Mn | 8.4 | 8.7 | 8.8 | 7.9 | 8.8 |  |
| Fe—Mn |  |  |  |  |  | 8.2 |
| MnO |  |  |  |  |  |  |

TABLE I—Continued (Part II)

| Flux example No. | 7 | 8 | 9 | 10 | 11 | 12 |
|---|---|---|---|---|---|---|
|  | Pct. | Pct. | Pct. | Pct. | Pct. | Pct. |
| $MnO_2$ | 3.4 | 3.6 |  |  | 4.1 | 3.6 |
| MgO | 7.1 | 7.2 |  | 8.5 | 4.1 | 7.2 |
| Rutile | 29.0 | 29.0 | 35.3 | 29.2 | 16.6 | 29.3 |
| $Al_2O_3$: |  |  |  |  |  |  |
| (1) High alumina slag |  | 14.4 | 17.3 | 14.6 | 8.2 | 14.3 |
| (2) Calcined bauxite | 15.4 |  |  |  |  |  |
| Fluoride: |  |  |  |  |  |  |
| Cryolite | 3.5 | 3.6 | 4.0 |  | 3.1 | 3.6 |
| $CaF_2$ |  |  |  | 5.5 |  |  |
| Magnetite | 7.1 | 7.2 |  | 12.2 | 47.5 | 7.2 |
| Iron | 16.6 | 14.0 | 20.2 | 9.1 |  | 16.7 |
| Fe—Si | 8.3 | 8.4 | 3.6 | 11.6 | 8.8 | 3.4 |
| Si—Mn |  |  |  |  |  |  |
| Fe—Mn | 8.3 | 8.4 | 5.0 | 7.9 | 6.8 | 8.4 |
| MnO |  |  | 12.9 |  |  |  |

The electrode used in each case was low-carbon steel. The diameter of the electrode was 3/32 of an inch. A direct current of 400 amperes was supplied to the electrode, and all the tests were carried out under an air draft of 3 miles per hour which had no effect upon the weld formed.

In Flux Example No. 9 above, manganese monoxide was used instead of manganese ore. This compound has no appreciable oxidizing effect, but otherwise imparts the same properties to the weld metal as does the manganese dioxide.

The preferred composition is that of above Flux Example No. 12. Such flux was also tried with alternating current using 3.0% potassium aluminate as the binder instead of sodium aluminate and proved to be entirely satisfactory. The welds produced had good mechanical properties as well as very good bead appearance in all types of welds.

Inasmuch as manganese ore and rutile contain some silica, the latter obviously is present in small percentages in the present flux, before use. However, deoxidizers are included to an extent such as to preclude silica, as such, from entering the weld.

What is claimed is:

1. A magnetic silica-free flux powder for consumable-electrode gas-shielded metal arc welding of steel, which is composed of 12–40% rutile, 1–10% fluoride, 1–10% silicon, 2–10% manganese, and 15–48% ferromagnetic material.

2. A silica-free magnetic flux for electric arc welding, that is composed of up to 13% manganese dioxide, up to 5% magnesium oxide, 17–33% rutile, up to 25% alumina, 2–6% fluoride, 2–9% silicon (ferroalloy), 4–7% manganese (ferroalloy), and 20–28% ferromagnetic material.

3. A fusible, finely-divided welding composition for use in the arc welding process hereinabove set forth which is free of compounds capable of evolving substantial quantities of gas in the welding zone and which consists essentially of from about 12 to about 40% of titanium dioxide, about 1 to about 10% of a fluoride selected from the group consisting of alkali fluorides, alkaline earth metal fluorides and alkali aluminum fluorides, about 1 to about 10% of a ferroalloy of silicon, about 2 to about 10% of an alloy of manganese selected from the group consisting of ferromanganese and silicomanganese, from about 15 to about 48% of magnetic constituent, and at least one metal oxide selected from the group consisting of aluminum oxide, magnesium oxide and an oxide of manganese and in an amount sufficient to assure at welding temperature a weld-protective slag.

4. Process of electric arc welding which comprises striking a welding arc between the end of a consumable wire electrode and a metal workpiece, coating such electrode with a layer of carbon dioxide gas-borne finely-divided fusible welding flux which is free of compounds capable of evolving substantial quantities of gas in the welding zone and which consists essentially of from about 12 to about 40% of titanium dioxide, about 1 to about 10% of a fluoride selected from the group consisting of alkali fluorides, alkaline earth metal fluorides and alkali aluminum fluorides, about 1 to about 10% of a ferroalloy of silicon, about 2 to about 10% of an alloy of manganese selected from the group consisting of ferromanganese and silicomanganese, from about 15 to about 48% of magnetic constituent, and at least one metal oxide selected from the group consisting of aluminum oxide, magnesium oxide and an oxide of manganese, such flux being in an amount sufficient to assure at welding temperature a weld-protective slag, and feeding such electrode toward such workpiece as the end of the electrode is melted by such arc and deposited on such workpiece.

References Cited in the file of this patent

UNITED STATES PATENTS

| | | |
|---|---|---|
| 1,374,711 | Armor | Apr. 12, 1921 |
| 2,003,167 | Alexander | May 28, 1935 |
| 2,518,366 | Pease | Aug. 8, 1950 |
| 2,681,875 | Keever et al. | June 22, 1954 |
| 2,727,125 | Muller | Dec. 13, 1955 |
| 2,737,150 | Gayley | May 6, 1956 |
| 2,803,740 | Hyink | Aug. 20, 1957 |